(12) United States Patent
Cross, Jr. et al.

(10) Patent No.: US 7,848,314 B2
(45) Date of Patent: Dec. 7, 2010

(54) VOIP BARGE-IN SUPPORT FOR HALF-DUPLEX DSR CLIENT ON A FULL-DUPLEX NETWORK

(75) Inventors: Charles W. Cross, Jr., Wellington, FL (US); Yan Li, Boynton Beach, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1244 days.

(21) Appl. No.: 11/382,575

(22) Filed: May 10, 2006

(65) Prior Publication Data

US 2007/0274296 A1 Nov. 29, 2007

(51) Int. Cl.
*H04L 12/66* (2006.01)
(52) U.S. Cl. .................. 370/352; 370/356; 370/276; 370/278; 370/294; 370/412
(58) Field of Classification Search .............. 370/276, 370/278, 294, 412, 352, 356
See application file for complete search history.

(56) References Cited

U.S. PATENT DOCUMENTS

| | | | |
|---|---|---|---|
| 5,349,635 A * | 9/1994 | Scott ................... | 379/93.34 |
| 5,577,165 A | 11/1996 | Takebayashi et al. | |
| 5,584,052 A | 12/1996 | Galau et al. | |
| 5,969,717 A | 10/1999 | Ikemoto | |
| 6,208,972 B1 | 3/2001 | Grant et al. | |
| 6,240,244 B1 | 5/2001 | Ikeda | |
| 6,243,375 B1 | 6/2001 | Speicher | |

(Continued)

FOREIGN PATENT DOCUMENTS

CN 1385783 12/2002

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner*—Jefferey F Harold
*Assistant Examiner*—Khaled Kassim
(74) *Attorney, Agent, or Firm*—Wolf, Greenfield & Sacks, P.C.

(57) ABSTRACT

Providing VOIP barge-in support for a half-duplex DSR client on a full-duplex network by buffering, in a half-duplex DSR client, input audio from the full-duplex network; playing, through the half-duplex DSR client, the buffered input audio; pausing, during voice activity on the half-duplex DSR client, the playing of the buffered input audio; sending, during voice activity on the half-duplex DSR client, speech for recognition through the full-duplex network to a voice server; receiving in the half-duplex DSR client through the full-duplex network from the voice server notification of speech recognition, the notification bearing a time stamp; and, responsive to receiving the notification, resuming the playing of the buffered input audio, including playing only buffered VOIP audio data bearing time stamps later than the time stamp of the recognition notification.

18 Claims, 5 Drawing Sheets

U.S. PATENT DOCUMENTS

| | | |
|---|---|---|
| 6,275,806 B1 | 8/2001 | Pertrushin |
| 6,301,560 B1 | 10/2001 | Masters |
| 6,453,020 B1 * | 9/2002 | Hughes et al. ........... 379/88.04 |
| 6,513,011 B1 | 1/2003 | Uwakubo |
| 6,563,804 B1 * | 5/2003 | Iyer et al. .................... 370/296 |
| 6,606,599 B2 | 8/2003 | Grant et al. |
| 6,765,882 B2 * | 7/2004 | Rittle et al. ................. 370/277 |
| 6,804,205 B1 * | 10/2004 | Nishimura et al. .......... 370/296 |
| 6,856,960 B1 | 2/2005 | Dragosh et al. |
| 6,920,425 B1 | 7/2005 | Will et al. |
| 6,947,526 B2 | 9/2005 | Wilson |
| 6,999,930 B1 | 2/2006 | Roberts et al. |
| 7,035,805 B1 | 4/2006 | Miller |
| 7,062,147 B2 | 6/2006 | Cooper et al. |
| 7,150,399 B2 | 12/2006 | Barrus et al. |
| 7,171,243 B2 | 1/2007 | Watanabe et al. |
| 7,188,067 B2 | 3/2007 | Grant et al. |
| 7,277,854 B2 * | 10/2007 | Bennett et al. ............... 704/257 |
| 7,313,103 B2 * | 12/2007 | Cox et al. .................... 370/285 |
| 7,330,890 B1 | 2/2008 | Partovi et al. |
| 7,376,586 B1 | 5/2008 | Partovi et al. |
| 7,437,286 B2 * | 10/2008 | Pi et al. ....................... 704/233 |
| 7,487,085 B2 | 2/2009 | Cross et al. |
| 7,496,387 B2 * | 2/2009 | Byford et al. ............ 455/575.2 |
| 7,580,706 B2 | 8/2009 | Koren et al. |
| 7,630,330 B2 * | 12/2009 | Gatts ........................... 370/277 |
| 7,634,064 B2 * | 12/2009 | Odinak .................... 379/88.01 |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0161585 A1 | 10/2002 | Gabel |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0088421 A1 * | 5/2003 | Maes et al. ............... 704/270.1 |
| 2003/0101451 A1 | 5/2003 | Bentolila et al. |
| 2003/0125945 A1 | 7/2003 | Doyle |
| 2003/0158732 A1 * | 8/2003 | Pi et al. ....................... 704/251 |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0224825 A1 * | 12/2003 | Cox et al. .................... 455/560 |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Seinel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Farrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kijirai |
| 2005/0075884 A1 | 4/2005 | Badt, Jr. |
| 2005/0091059 A1 | 4/2005 | Lecoeuche |
| 2005/0122985 A1 | 6/2005 | Murphy |
| 2005/0131701 A1 | 6/2005 | Cross |
| 2005/0138219 A1 | 6/2005 | Boughannam |
| 2005/0138647 A1 | 6/2005 | Boughannam |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger |
| 2005/0283367 A1 | 12/2005 | Cross et al. |
| 2006/0047510 A1 | 3/2006 | Ativanichayaphong et al. |
| 2006/0064302 A1 | 3/2006 | Cross et al. |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0260743 A1 | 11/2007 | Oijer |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross et al. |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| GB | 0507148.5 | 4/2005 |
| JP | 2000155529 A | 6/2000 |
| JP | 02003140672 A | 5/2003 |

| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, Al, Sep. 16, 2002, p. 853, XP007011561 ISBN:9788-1-876346-40-9.

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

* cited by examiner

VOIP BARGE-IN SUPPORT FOR HALF-DUPLEX DSR CLIENT ON A FULL-DUPLEX NETWORK

BACKGROUND OF THE INVENTION

1. Field of the Invention

The field of the invention is data processing, or, more specifically, methods, apparatus, and products for providing voice over the Internet Protocol ('VOIP') barge-in support for a half-duplex distributed speech recognition ('DSR') client on a full-duplex network

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier. Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+ Voice ('X+V'). X+V provides a markup language that enables users to interact with an multimodal application often running on a server through spoken dialog in addition to traditional means of input such as keyboard strokes and mouse pointer action. X+V adds spoken interaction to standard web content by integrating XHTML (extensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

The performance of speech recognition systems receiving speech that has been transmitted over voice channels, particularly mobile channels, can be significantly degraded when compared to using an unmodified signal. The degradations are as a result of both relatively low bit rate speech coding and channel transmission errors. A Distributed Speech Recognition ('DSR') system addresses these problems by eliminating the speech channel and instead using an error protected data channel to send a parameterized representation of the speech, which is suitable for recognition. The processing is distributed between terminal or client device and a voice server. The client performs the feature parameter extraction—the frontend of the speech recognition function. The speech features are then transmitted over a data channel to a remote back-end recognizer or speech recognition engine on a voice server. This architecture substantially reduces transmission channel effects on speech recognition performance.

In many instances of client devices, however, the client device is capable of half-duplex communication only. That is, the client device may accept audio input from a user or deliver audio output to a user but cannot do both at the same time. The data communications full-duplex network that connects the half-duplex DSR client to a voice server typically is a full-duplex network, capable of sending data and receiving data to and from a client device both at the same time. Barge-in is a feature of a DSR system that allows a user to interrupt at any time, while a prompt is playing, permitting natural exchange between an experienced user and the DSR system. In a DSR system that supports half-duplex DSR clients, barge-in support is a challenge because audio input, from TTS conversion on a voice server, for example, may be played to a user despite the fact that the user attempted a barge-in—because of the half-duplex nature of the DSR client that can send or receive audio, but not both at the same time.

SUMMARY OF THE INVENTION

Methods, apparatus, and computer program products are described for providing VOIP barge-in support for a half-duplex DSR client on a full-duplex network by buffering, in a half-duplex DSR client, input audio from the full-duplex network, where the input audio includes VOIP audio data for output through the half-duplex DSR client and the buffered input audio bears time stamps; playing, through the half-duplex DSR client, the buffered input audio; pausing, during voice activity on the half-duplex DSR client, the playing of the buffered input audio; sending, during voice activity on the half-duplex DSR client, speech for recognition through the full-duplex network to a voice server; receiving in the half-duplex DSR client through the full-duplex network from the voice server notification of speech recognition, the notification bearing a time stamp; and, responsive to receiving the notification, resuming the playing of the buffered input audio, including playing only buffered VOIP audio data bearing time stamps later than the time stamp of the recognition notification.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
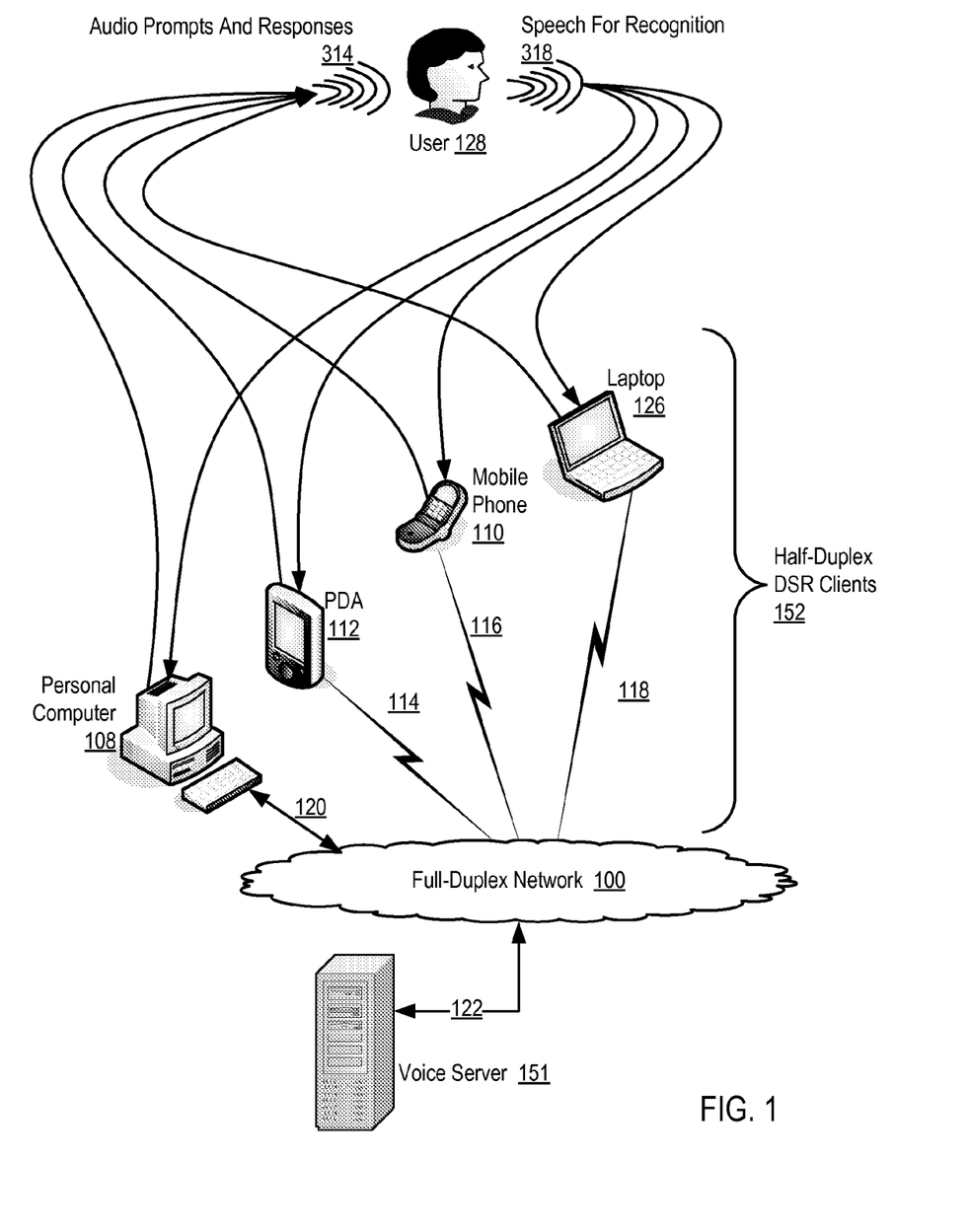
FIG. 1 sets forth a network diagram illustrating an exemplary system for providing VOIP barge-in support for a half-duplex DSR client on a full-duplex network according to embodiments of the present invention.

Exemplary methods, apparatus, and products for providing VOIP barge-in support for a half-duplex DSR client on a full-duplex network according to embodiments of the present invention are described with reference to the accompanying drawings, beginning with FIG. 1. FIG. 1 sets forth a network diagram illustrating an exemplary system for providing VOIP barge-in support for a half-duplex DSR client on a full-duplex network according to embodiments of the present invention.

The system of FIG. 1 operates generally to provide VOIP barge-in support for a half-duplex DSR client (152) on a full-duplex network (100) according to embodiments of the present invention by buffering, in a half-duplex DSR client (152), input audio from the full-duplex network (100), where the input audio includes VOIP audio data for output through the half-duplex DSR client and the buffered input audio bears time stamps; playing, through the half-duplex DSR client, the buffered input audio; pausing, during voice activity on the half-duplex DSR client, the playing of the buffered input audio; sending, during voice activity on the half-duplex DSR client, speech for recognition through the full-duplex network to a voice server; receiving in the half-duplex DSR client through the full-duplex network from the voice server notification of speech recognition, the notification bearing a time stamp; and, responsive to receiving the notification, resuming the playing of the buffered input audio, including playing only buffered VOIP audio data bearing time stamps later than the time stamp of the recognition notification. In this example, input audio from the full-duplex network (100) is implemented as Voice Over Internet Protocol ('VOIP').

A half-duplex DSR client is an automated device, automated computing machinery, or a computer program running on an automated device, that is capable of accepting speech input and streaming digitized speech to a voice server for recognition. The digitized speech may be compressed according to telephony industry standard codecs, including those used for Distributed Speech Recognition. A half-duplex DSR client may be implemented, for example, as a voice-enabled browser on a laptop, a voice browser on a telephone handset, an online game implemented with Java on a personal computer, and with other combinations of hardware and software as may occur to those of skill in the art.

The system of FIG. 1 includes several example half-duplex DSR clients:
  personal computer (108) which is coupled for data communications to full-duplex network (100) through wireline connection (120),
  personal digital assistant ('PDA') (112) which is coupled for data communications to full-duplex network (100) through wireless connection (114),
  mobile telephone (110) which is coupled for data communications to full-duplex network (100) through wireless connection (116), and
  laptop computer (126) which is coupled for data communications to full-duplex network (100) through wireless connection (118).

As explained in more detail below, each of the example half-duplex DSR clients (152) in the system of FIG. 1 includes a microphone, an audio amplifier, a digital-to-analog converter, and a DSR client software application capable of accepting from a user (128) speech for recognition (318), parameterizing the speech by extracting speech parameters, and sending the speech to a voice server (151) for recognition. The half-duplex DSR clients in this example are also typically capable of employing voice activity detection ('VAD') to distinguish voice activity from non-voice audio signals and identify only the voice activity as speech to be transmitted for recognition.

Each of the example half-duplex DSR clients (152) in the system of FIG. 1 is capable of providing VOIP barge-in support for a half-duplex DSR client on a full-duplex network according to embodiments of the present invention by buffering, in the half-duplex DSR client, input audio from the full-duplex network, where the input audio is composed of VOIP audio data for output through the half-duplex DSR client; playing, through the half-duplex DSR client, the buffered input audio; pausing, during voice activity on the half-duplex DSR client, the playing of the buffered input audio; sending, during voice activity on the half-duplex DSR client, speech for recognition through the full-duplex network to a voice server; receiving in the half-duplex DSR client through the full-duplex network from the voice server notification of speech recognition, the notification bearing a time stamp; and, responsive to receiving the notification, resuming the playing of the buffered input audio, including playing only buffered VOIP audio data bearing time stamps later than the time stamp of the recognition notification. The use of these four example half-duplex DSR clients (152) is for explanation only, not for limitation of the invention. Any automated computing machinery capable of accepting speech from a user, sending the speech to a voice server, and receiving and playing speech prompts and responses from the voice server may function as a half-duplex DSR client for providing VOIP barge-in support according to embodiments of the present invention.

The system of FIG. 1 also include a voice server (151) which is connected to full-duplex network (100) through full-duplex wireline connection (122). The voice server (151) is a computer that runs a DSR server application program that provides voice recognition services for half-duplex DSR clients by accepting requests for speech recognition and returning text representing recognized speech. Voice server (151) also provides text to speech ('TTS') conversion for voice prompts and voice responses (314) to user input in DSR client applications such as, for example, X+V applications or Java Speech applications. In some embodiments, the voice server (151) may be configured to provide, in response to a request from a half-duplex DSR client for text-to-speech conversion, time stamps on audio prompts and responses that are then streamed back as part of the audio input to the half-duplex device; in such an embodiment, the time stamps represent the time when audio packets are transmitted from the voice server. Alternatively, the voice server (151) may be configured to provide, in response to a request from a half-duplex DSR client for text-to-speech conversion, audio prompts and responses without time stamps that are streamed back as part of the audio input to the half-duplex device, and the half-duplex device may then be configured to insert time stamps representing the time when audio packets are received in the half-duplex device.

Voice server (151) also provides to a half-duplex DSR client a notification of voice recognition when the voice server recognizes speech sent to the voice server from the half-duplex DSR client for recognition. The voice server (151) may include a time stamp on the notification of voice recognition, the time stamp representing the time when the notification is transmitted from the voice server. Alternatively, the voice server (151) may transmit the notification without a time stamp, and the half-duplex device may be configured to associate a time stamp with the notification, the time stamp in that case representing the time when the notification is received at the half-duplex DSR client.

The system of FIG. 1 includes a full-duplex network (100) that connects the half-duplex DSR clients (152) and the voice server (151) for data communications. A full-duplex network for providing VOIP barge-in support for a half-duplex DSR client on a full-duplex network according to embodiments of the present invention is a data communications full-duplex network composed of a plurality of computers that function as data communications routers connected for data communications with a packet switching protocols. Such a full-duplex network may be implemented with optical connections, wireline connections, or with wireless connections. Such a full-duplex network may include intranets, internets, local area full-duplex networks ('LANs'), and wide area full-duplex networks ('WANs'). Such a full-duplex network may implement:

- a link layer with the Ethernet™ Protocol or the Wireless Ethernet™ Protocol,
- a full-duplex network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The arrangement of the voice server (151), the half-duplex DSR clients (152), and the full-duplex network (100) making up the exemplary system illustrated in FIG. 1 are for explanation, not for limitation. Data processing systems useful for providing VOIP barge-in support for a half-duplex DSR client on a full-duplex network according to various embodiments of the present invention may include additional servers, routers, other devices, and peer-to-peer architectures, not shown in FIG. 1, as will occur to those of skill in the art. Full-duplex networks in such data processing systems may support many data communications protocols in addition to those noted above. Various embodiments of the present invention may be implemented on a variety of hardware platforms in addition to those illustrated in FIG. 1.

Providing VOIP barge-in support for a half-duplex DSR client on a full-duplex network in accordance with the present invention is generally implemented with one or more voice servers, computers, that is, automated computing machinery, that provide speech recognition. For further explanation, therefore, FIG. 2 sets forth a block diagram of automated computing machinery comprising an example of a computer useful as a voice server (151) in providing VOIP barge-in support for a half-duplex DSR client on a full-duplex network according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Figure 2:
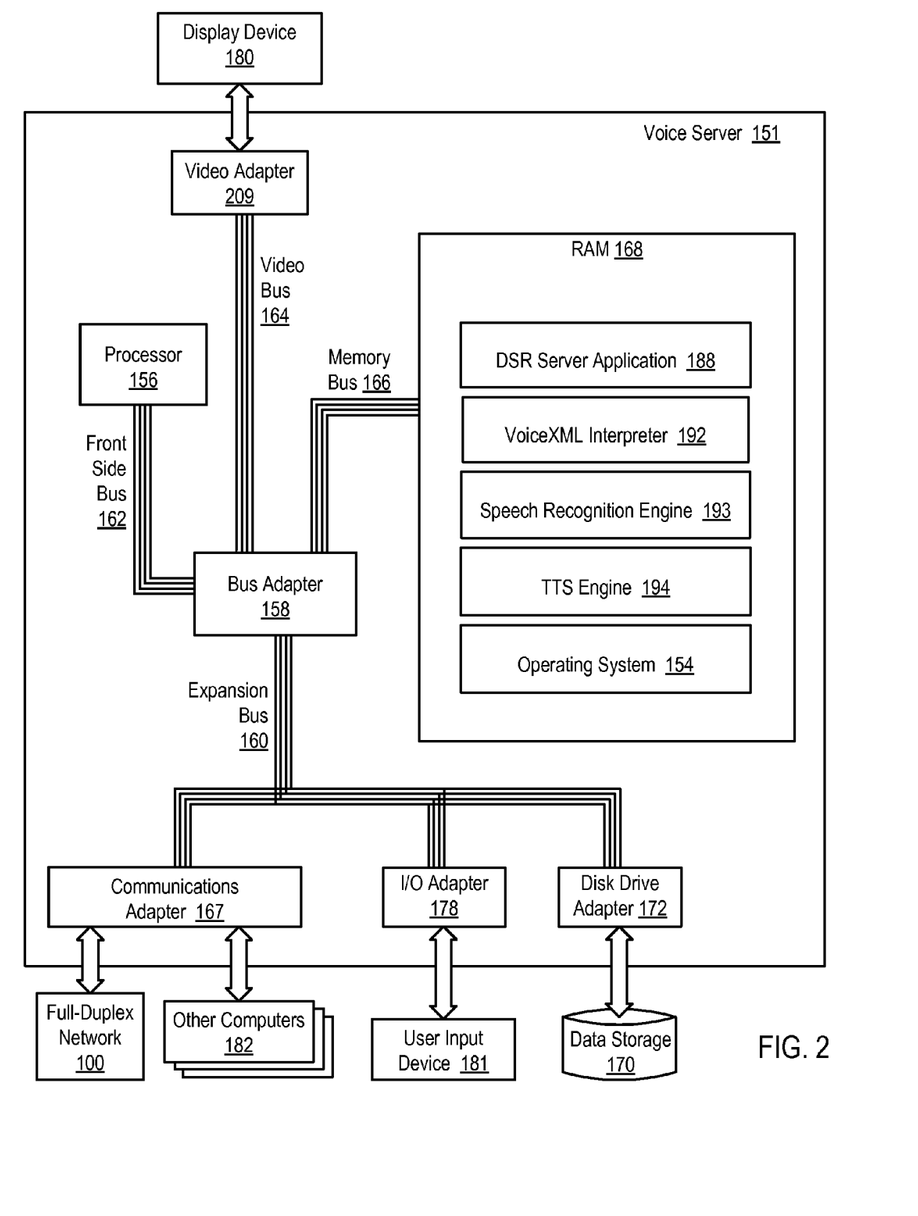
FIG. 2 sets forth a block diagram of automated computing machinery comprising an example of a computer useful as a voice server in providing VOIP barge-in support for a half-duplex DSR client on a full-duplex network according to embodiments of the present invention.

Stored in RAM (168) is a DSR server application (188), a module of computer program instructions capable of operating a voice server in a system that supports providing VOIP barge-in support for a half-duplex DSR client on a full-duplex network according to embodiments of the present invention by providing voice recognition services for half-duplex DSR clients by accepting requests for speech recognition and returning text representing recognized speech. DSR server application (188) also includes computer program instructions that provide text-to-speech ('TTS') conversion for voice prompts and voice responses to user input in DSR client applications such as, for example, X+V applications or Java Speech applications. In some embodiments, the DSR server application (188) may be configured to provide, in response to a request from a half-duplex DSR client for text-to-speech conversion, time stamps on audio prompts and responses that are then streamed back as part of the audio input to the half-duplex device; in such an embodiment, the time stamps represent the time when audio packets are transmitted from the voice server. Alternatively, the DSR server application (188) may be configured to provide, in response to a request from a half-duplex DSR client for text-to-speech conversion, audio prompts and responses without time stamps that are streamed back as part of the audio input to the half-duplex device, and the half-duplex device may then be configured to insert time stamps representing the time when audio packets are received in the half-duplex device.

DSR server application (188) also includes computer program instructions that provide to a half-duplex DSR client a notification of voice recognition when the voice server recognizes speech sent to the voice server from the half-duplex DSR client for recognition. The DSR server application (188) may include a time stamp on the notification of voice recognition, the time stamp representing the time when the notification is transmitted from the voice server to the half-duplex device. Alternatively, the DSR server application (188) may transmit the notification without a time stamp, and the half-duplex DSR client may be configured to associate a time stamp with the notification, the time stamp in that case representing the time when the notification is received at the half-duplex DSR client.

DSR server application (188) typically is a user-level, multimodal, server-side computer program. DSR server application (188) may, for example, be implemented with a set of VoiceXML documents which taken together comprise a VoiceXML application. DSR server application (188) may, for example, alternatively be implemented as a web server that supports X+V by providing responses to HTTP requests from X+V clients.

Also stored in RAM is a VoiceXML interpreter (192), a module of computer program instructions that parses and executes VoiceXML. VoiceXML input to VoiceXML interpreter (192) may originate from VoiceXML clients of half-duplex DSR clients or from X+V clients of half-duplex DSR clients. In this example, VoiceXML interpreter (192) interprets and executes VoiceXML segments provided to VoiceXML interpreter (192) through DSR server application (188).

Also stored in RAM (168) is a speech recognition engine (193), a module of computer program instructions that accepts digitizedspeech for recognition as preprocessed by a half-duplex DSR client, converts the digitizedspeech to text, parses the converted speech against a vocabulary or grammar, and returns text representing recognized speech. Also stored in RAM (168) is a Text To Speech ('TTS') Engine (194), a module of computer program instructions that accepts text as input and returns the same text in the form of digitally encoded speech, for use in providing speech as prompts for and responses to users of DSR systems. In this example, such digitally encoded speech is provided by the voice server for streaming as input audio in the form of VOIP through a full-duplex network to a half-duplex DSR client.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), DSR server application (188), VoiceXML interpreter (192), speech recognition engine (193), and Text To Speech Engine (194) in the example of FIG. 2 are shown in RAM (168), but many components of such software typically are stored in non-volatile memory also, for example, on disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a full-duplex network (100). Such data communications may be carried out serially through RS-232 connections, through external buses such as a Universal Serial Bus ('USB'), through data communications full-duplex networks such as IP full-duplex networks, and in other ways as will occur to those of skill in the art. Communications adapters implement the hardware level of data communications through which one computer sends data communications to another computer, directly or through a full-duplex network. Examples of communications adapters useful for providing VOIP barge-in support for a half-duplex DSR client on a full-duplex network streaming audio through a full-duplex network to a half-duplex DSR client according to embodiments of the present invention include modems for wired dial-up communications, Ethernet (IEEE 802.3) adapters for wired full-duplex network communications, and 802.11 adapters for wireless full-duplex network communications.

Providing VOIP barge-in support for a half-duplex DSR client on a full-duplex network in accordance with the present invention is generally implemented with one or more half-duplex DSR clients, that is, automated computing machinery or computers. In the system of FIG. 1, for example, all the half-duplex DSR clients are implemented to some extent at least as computers. For further explanation, therefore, FIG. 3 sets forth a block diagram of automated computing machinery comprising an example of a computer useful as a half-duplex DSR client (152) in providing VOIP barge-in support for a half-duplex DSR client on a full-duplex network according to embodiments of the present invention. The half-duplex DSR client (152) of FIG. 3 includes at least one computer processor (156) or 'CPU' as well as random access memory (168) ('RAM') which is connected through a high speed memory bus (166) and bus adapter (158) to processor (156) and to other components of the half-duplex DSR client.

Figure 3:
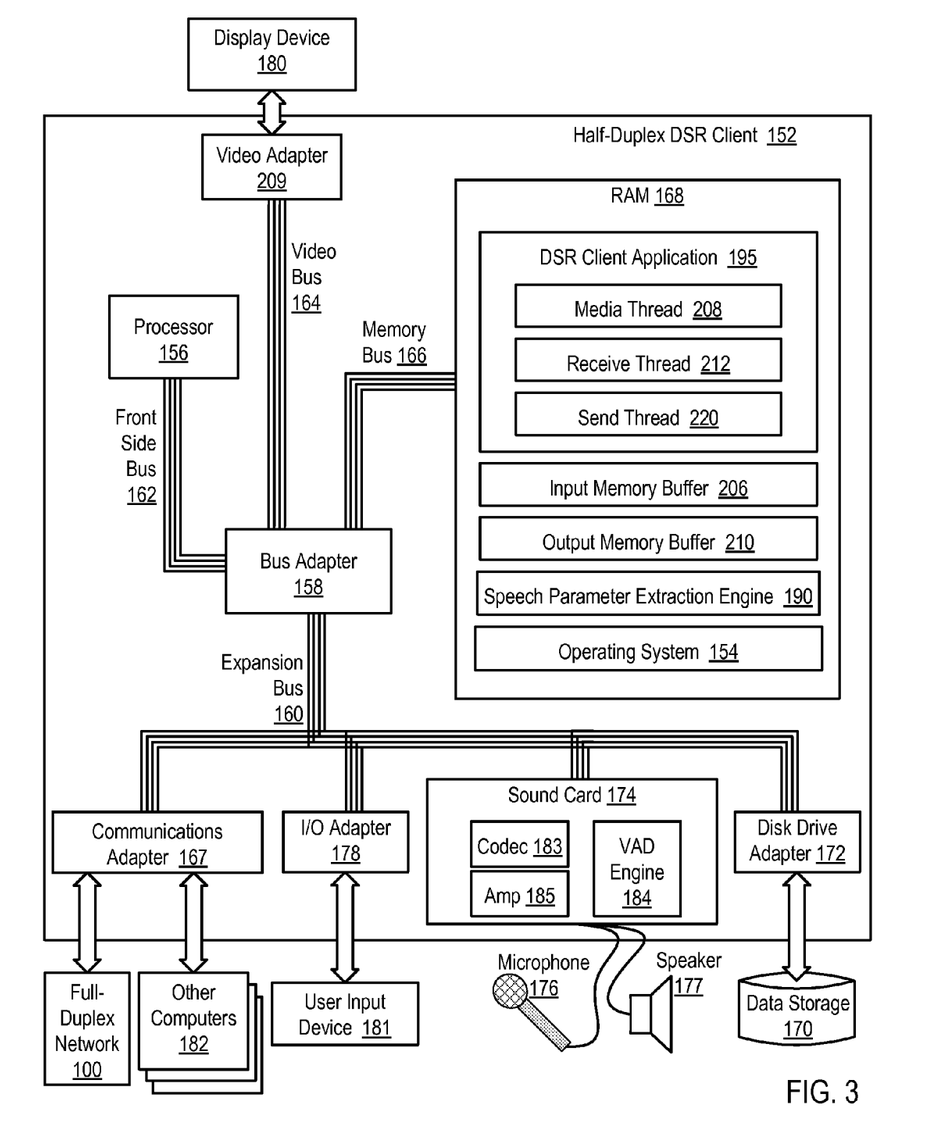
FIG. 3 sets forth a block diagram of automated computing machinery comprising an example of a computer useful as a half-duplex DSR client in providing VOIP barge-in support for a half-duplex DSR client on a full-duplex network according to embodiments of the present invention.

Stored in RAM (168) is a half-duplex DSR client application (195), a module of computer program instructions capable of providing VOIP barge-in support for a half-duplex DSR client on a full-duplex network according to embodiments of the present invention by buffering input audio from a full-duplex network, where the input audio includes VOIP audio data for output through the half-duplex DSR client and the buffered input audio bears time stamps; playing the buffered input audio; pausing, during voice activity on the half-duplex DSR client, the playing of the buffered input audio; sending, during voice activity on the half-duplex DSR client, speech for recognition through the full-duplex network to a voice server; receiving, through the full-duplex network from the voice server, notification of speech recognition, the notification bearing a time stamp; and, responsive to receiving the notification, resuming the playing of the buffered input audio, including playing only buffered VOIP audio data bearing time stamps later than the time stamp of the recognition notification.

Also in RAM (168) is an input memory buffer (206). Input memory buffer (206) is a segment of memory organized by a data structure, such as, for example, a FIFO queue, as a buffer for temporary storage of input audio from a full-duplex network. The input audio is packets of computer data, digitally encoded packets of VOIP audio data to be output in sequence through the half-duplex DSR client, that is, played through a sound card (174), decoded by a codec (183), amplified by an audio amplifier (185), and output through an audio speaker (177) to the ear of a user.

Also in RAM (168) is an output memory buffer (210). Output memory buffer (210) is a segment of memory organized by a data structure, such as, for example, a FIFO queue, as a buffer for temporary storage of speech for recognition in a half-duplex DSR client. The speech for recognition is packets of computer data, digitally encoded packets of VOIP audio data, to be output in sequence from the half-duplex DSR client to a full-duplex network.

Also in RAM (168) is a media thread (208) of the DSR client application (195). Media thread (208) is a set of computer program instructions capable of controlling a half-duplex DSR client so as to play buffered input audio and pause the play of buffered input audio during voice activity on the half-duplex DSR client. Media thread (208) may record speech for recognition during the voice activity for transmission to a voice server. Or media thread (208) may provide speech for recognition directly to a send thread for transmission to a voice server, through a shared memory segment or some other method of inter-process communication. Or in some embodiments, media thread (208) may itself be configured to transmit speech for recognition to a voice server.

Media thread (208) may be configured to receive, through a full-duplex network from a voice server, notification of speech recognition, the notification bearing a time stamp. The voice server may affix the time stamp, representing the time when the notification is transmitted from the voice server, or the media thread in such an embodiment may affix the time stamp to represent the time when the notification is received in the half-duplex DSR client.

Media thread (208), responsive to receiving a notification of voice recognition, is configured to resume the playing of the buffered input audio, including playing only buffered VOIP audio data bearing time stamps later than the time stamp of the recognition notification. That is, media thread (208) is configured to discard buffered input audio bearing time stamps earlier than the time when the notification of speech recognition was sent from the voice server. Or, if the notification is not time-stamped by the voice server, media thread (208) may be configured to discard buffered input audio bearing time stamps earlier than the time when the notification of speech recognition is received in the half-duplex DSR client.

Also in RAM (168) is a receive thread (212) of the DSR client application (195). Receive thread (212) is a set of computer program instructions capable of causing a half-duplex DSR client to buffer input audio by receiving VOIP audio data through an input audio stream from a full-duplex network and storing the VOIP audio data in an input memory buffer. In addition, in embodiments where the media thread is not configured to receive the notification of speech recognition, for example, receive thread (212) may be configured to receive, through a full-duplex network from a voice server, notification of speech recognition, the notification bearing a time stamp. The voice server may affix the time stamp, representing the time when the notification is transmitted from the voice server, or the media thread in such an embodiment may affix the time stamp to represent the time when the notification is received in the half-duplex DSR client.

Also in RAM (168) is a send thread (220) of the DSR client application (195). Send thread (220) is a set of computer program instructions capable of causing a half-duplex DSR client to send speech for recognition from an output memory buffer through an output audio stream to a full-duplex network.

Also stored in RAM (168) is a speech parameter extraction engine (190), a module of computer program instructions that accepts digitally encoded speech from a sound card (174), for example, extracts from the encoded speech parameters that describe the speech sufficiently to support speech recognition, and provides the parameterized speech to the DSR client application (195) for sending to a voice server.

Also stored in RAM (168) is an operating system (154). Operating systems useful in half-duplex DSR clients according to embodiments of the present invention include UNIX™, Linux™, Microsoft NT™, AIX™, IBM's i5/OS™, and others as will occur to those of skill in the art. Operating system (154), half-duplex DSR client application (195), and speech parameter extraction engine (190) in the example of FIG. 3 are shown in RAM (168), but many components of such software typically are stored in non-volatile memory also.

The half-duplex DSR client (152) of FIG. 3 includes a bus adapter (158), a computer hardware component that contains drive electronics for the high speed buses, the front side bus (162), the video bus (164), and the memory bus (166), as well as for the slower expansion bus (160). Examples of bus adapters useful in half-duplex DSR clients according to embodiments of the present invention include the Intel Northbridge, the Intel Memory Controller Hub, the Intel Southbridge, and the Intel I/O Controller Hub. Examples of expansion buses useful in half-duplex DSR clients according to embodiments of the present invention include Industry Standard Architecture ('ISA') buses and Peripheral Component Interconnect ('PCI') buses.

Half-duplex DSR client (152) of FIG. 3 includes disk drive adapter (172) coupled through expansion bus (160) and bus adapter (158) to processor (156) and other components of the half-duplex DSR client (152). Disk drive adapter (172) connects non-volatile data storage to the half-duplex DSR client (152) in the form of disk drive (170). Disk drive adapters useful in half-duplex DSR clients include Integrated Drive Electronics ('IDE') adapters, Small Computer System Interface ('SCSI') adapters, and others as will occur to those of skill in the art. In addition, non-volatile computer memory may be implemented for a half-duplex DSR client as an optical disk drive, electrically erasable programmable read-only memory space (so-called 'EEPROM' or 'Flash' memory), RAM drives, and so on, as will occur to those of skill in the art.

The example half-duplex DSR client of FIG. 3 includes one or more input/output ('I/O') adapters (178). I/O adapters in half-duplex DSR clients implement user-oriented input/output through, for example, software drivers and computer hardware for controlling output to display devices such as computer display screens, as well as user input from user input devices (181) such as keyboards and mice. The example half-duplex DSR client of FIG. 3 includes video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example half-duplex DSR client of FIG. 3 also includes sound card (174), which is an example of an I/O adapter specially designed for accepting analog audio signals from a microphone (176) and converting the audio analog signals to digital form for further processing by a VAD engine (184) and a speech parameter extraction engine (190). Sound card (174) is connected to processor (156) through expansion bus (160), bus adapter (158), and front side bus (162).

The exemplary half-duplex DSR client (152) of FIG. 3 includes a communications adapter (167) for data communications with other computers (182) and for data communications with full-duplex network (100). Such data communications may be carried out through serially through RS-232 connections, through external buses such as a Universal Serial Bus ('USB'), through data communications full-duplex networks such as IP full-duplex networks, and in other ways as will occur to those of skill in the art. Communications adapters implement the hardware level of data communications through which one computer sends data communications to another computer, directly or through a full-duplex network. Examples of communications adapters useful for providing VOIP barge-in support for a half-duplex DSR client on a full-duplex network according to embodiments of the present invention include modems for wired dial-up communications, Ethernet (IEEE 802.3) adapters for wired full-duplex network communications, and 802.11b adapters for wireless full-duplex network communications.

Figure 4:
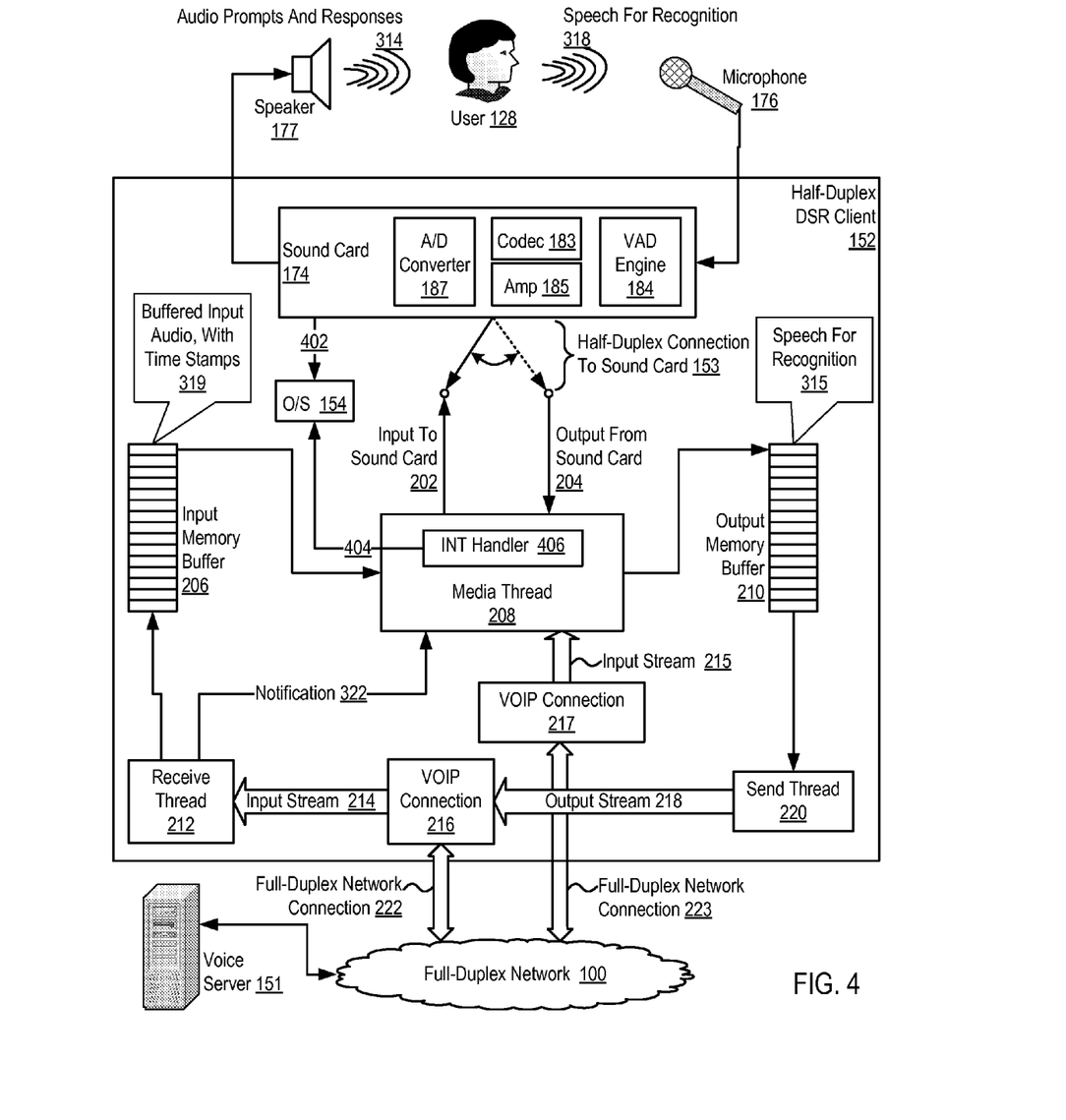
FIG. 4 sets forth a functional block diagram of exemplary apparatus for providing VOIP barge-in support for a half-duplex DSR client on a full-duplex network according to embodiments of the present invention.

For further explanation, FIG. 4 sets forth a functional block diagram of exemplary apparatus for providing VOIP barge-in support for a half-duplex DSR client on a full-duplex network according to embodiments of the present invention. The example of FIG. 4 includes a half-duplex DSR client (152) that, as explained in more detail below, can play audio output or accept speech input, but cannot do both at the same time.

The example half-duplex DSR client (152) includes an input memory buffer (206), a segment of memory organized by a data structure, such as, for example, a FIFO queue, as a buffer for temporary storage of input audio from a full-duplex network (100). The example half-duplex DSR client (152) also includes an output memory buffer (210), a segment of memory organized by a data structure, such as, for example, a FIFO queue, as a buffer for temporary storage of speech for recognition to be sent in sequence from the half-duplex DSR client (152) to a full-duplex network (100).

The example half-duplex DSR client (152) also includes a media thread (208), which is, as explained in more detail below, a set of computer program instructions capable of controlling a half-duplex DSR client so as to play buffered input audio (319) and pause the play of buffered input audio (319) during voice activity on the half-duplex DSR client. Media thread (208) may record speech for recognition (314) during the voice activity for transmission to a voice server— in an output memory buffer (210), for example. Or media thread (208) may provide speech for recognition directly to a send thread (220) for transmission to a voice server (151), through a shared memory segment or some other method of inter-process communication, for example. Or in some embodiments, media thread (208) may itself be configured to transmit speech for recognition to a voice server, through its own VOIP connection (217), for example.

Media thread (208) may be configured to receive, through a full-duplex network (100) from a voice server (151), notification of speech recognition, the notification bearing a time stamp. Media thread (208) may receive notification of speech recognition 'out-of-band' in this sense: Buffering input audio may be carried out by a receive thread (212) that receives VOIP audio data from an input audio stream (214) in accordance with a first VOIP data communications protocol, RTP or H.323, for example, while the media thread (208) receives notification of speech recognition through a second 'out-of-band' VOIP data communications protocol, the IETF's Distributed Multimodal Synchronization Protocol ('DMSP') or SIP, for example. In this way, the input audio from the voice server is received according to one protocol, and the speech recognition notification is received 'out-of-band' through another protocol, in fact, even through a separate data stream (215), a separate VOIP connection (217), and a separate full-duplex connection (223) to the network (100). Media thread (208) may establish its own VOIP connection (217) through the full-duplex network (100) to voice server (151) as, for example, a Transmission Control Protocol ('TCP') connection using, for example, a socket implemented with a sockets application programming interface ('API') for TCP, and attach an input data stream (215) to the socket through which the media thread (208) may receive from the voice server notifications of speech recognition. The voice server may affix the time stamp, representing the time when the notification is transmitted from the voice server, or the media thread in such an embodiment may affix the time stamp to represent the time when the notification is received in the half-duplex DSR client.

Media thread (208), responsive to receiving a notification of voice recognition, is configured to resume the playing of the buffered input audio, including playing only buffered VOIP audio data bearing time stamps later than the time stamp of the recognition notification. That is, media thread (208) is configured to discard buffered input audio bearing time stamps earlier than the time when the notification of speech recognition was sent from the voice server. Or, if the notification is not time-stamped by the voice server, media thread (208) may be configured to discard buffered input audio bearing time stamps earlier than the time when the notification of speech recognition is received in the half-duplex DSR client.

The example half-duplex DSR client (152) also includes a receive thread (212), a set of computer program instructions capable of causing a half-duplex DSR client to buffer input audio by receiving VOIP audio data through an input audio stream (214) from a full-duplex network (100) and storing the VOIP audio data in an input memory buffer (206). In addition, in embodiments where the media thread is not configured to receive the notification of speech recognition directly through its own data communications connection, for example, receive thread (212) may be configured to receive, through a full-duplex network from a voice server, notification of speech recognition, the notification bearing a time stamp.

In such embodiments, the receive thread receives VOIP audio data from an input audio stream (214) in accordance with a VOIP data communications protocol and also receives notification of speech recognition through the same VOIP data communications protocol, RTP or H.323, for example. RTP or an H.323 protocol may be modified to include notifications of speech recognition by use of an existing flag field in a current message type or such a protocol may be improved by addition of a new message type to represent a notification of speech recognition. This configuration is an 'in-band' notification, where the notification is received through the same protocol used to stream the input audio from the voice server to the half-duplex DSR client.

In such embodiments, the receive thread (212) is configured to provide the received notification (322) of speech recognition to the media thread (208), after which the media thread will discard from the input memory buffer all buffered input audio having time stamps earlier than the time stamp on the notification and resume playing the buffered input audio. The voice server may affix the time stamp, representing the time when the notification is transmitted from the voice server, or the receive thread in such an embodiment may affix the time stamp to represent the time when the notification is received in the half-duplex DSR client.

The example half-duplex DSR client (152) also includes a send thread (220), a set of computer program instructions capable of causing a half-duplex DSR client to send speech for recognition (314) from an output memory buffer (210) through an output audio stream (218) to a full-duplex network (100). As mentioned above, the media thread (208), the receive thread (212), and the send thread (220) typically are implemented as components of a DSR client application program of the half-duplex DSR client.

The example half-duplex DSR client (152) also includes an operating system (154). Operating systems useful in half-duplex DSR clients according to embodiments of the present invention include UNIX™, Linux™, Microsoft NT™, AIX™, IBM's i5/OS™, and others as will occur to those of skill in the art.

The example half-duplex DSR client (152) includes a sound card (174) that in turn includes an analog-to-digital converter (187), a codec (183), an audio amplifier (185), and a voice activity detection ('VAD') engine (184). The analog-to-digital converter accepts an analog audio signal from a microphone (176) and converts the signal to digital form which is then encoded into a standard audio encoding format by codec (183) which then may be recorded in output memory buffer (210) to be sent to full-duplex network (100). Codec (183) is also capable of decoding buffered input audio (319) to be played to a user (128) through an audio speaker (177).

The sound card also includes a voice activity detection ('VAD') engine (184), a module of computer program instructions that detect voice activity on the microphone (176) of the half-duplex DSR client (152) and advise media thread (208) of the voice activity. There are a number of ways in which VAD engine (184) may detect voice activity:

- The VAD engine (184) may detect voice activity by monitoring the state, on or off, a push-to-talk ('PTT') switch on the microphone (176).
- The VAD engine (184) may detect voice activity by implementing a 'voice operated switch' or 'VOX,' an electronic switch that operates when a sound level over a certain threshold is detected. A VOX is a space-saving substitute for a push-to-talk switch on a half-duplex DSR client. A VOX circuit usually includes a delay that leaves the circuit activated when the voice activity stops temporarily—to keep the circuit from turning off during short pauses in speech.
- The VAD engine (184) may detect voice activity by accepting digitally encoded audio signals from A/D converter (187) and employing statistical techniques to filter out portions of the audio signals that represent mere noise or non-voice audio.
- The VAD engine (184) may detect voice activity in other ways as will occur to those of skill in the art.

Having detected voice activity, the VAD engine (184) may advise media thread (208) of the voice activity by use of a VAD interrupt. That is, VAD engine (184) is configured to cause the sound card (174) to issue an operating system interrupt, referred to here as a 'VAD interrupt' (402), and media thread (208) is configured with an interrupt handler (406) that is registered (404) in the operating system (154) of the half-duplex DSR client as a listener for VAD interrupts from the sound card. VAD interrupts may include at least two types: one advising onset of voice activity and another advising cessation of voice activity.

Half-duplex DSR client (152) is 'half-duplex' in this sense: The sound card (714) in this example can accept as input (202) buffered input audio (319) to play through a speaker (177) to a user (128) or the sound card can provide output (204) of digitized, encoded audio signals for media thread (208) to record, but the sound card cannot both accept input for playing and provide output for recording at the same time. Similarly, the media thread (208) is configured to provide buffered input audio (319) as input (202) to the sound card for playing to a user or to accept output (204) for recording, but not both at the same time.

Media thread (208) is configured to avoid loss of input audio, therefore, by playing buffered input audio (319) through the sound card (174) until receipt of a VAD interrupt indicating onset of voice activity. Then during voice activity, that is, before notification of speech recognition, the media thread records output from the sound card (210) as speech for recognition (315) in output memory buffer (210). After receiving a notification of speech recognition, the media thread (208) resumes the playing of the buffered input audio (319), playing only buffered input audio bearing time stamps later than the time stamp of the recognition notification.

Because buffered input audio (319) packets from the full-duplex network are buffered during voice activity (the receive thread runs all the time), the input memory buffer (206) contains input audio that becomes irrelevant when voice activity representing a barge-in begins. When the media thread (208) resumes the playing of the buffered input audio (318) after receiving notification of speech recognition, playing only buffered input audio bearing time stamps later than the time stamp of the recognition notification, none of the now irrelevant buffered input audio is played. Discarding buffered input audio bearing time stamps earlier than the notification of speech recognition discards buffered input audio representing prompts and responses rendered irrelevant by the barge-in. Rather than being forced to listen to prompts and responses that the user now knows to be irrelevant, the user is smoothly presented with the next pertinent prompt or response through the half-duplex DSR client.

In this example, the media thread (208) records speech for recognition (315) in the output memory buffer (210). In effect, speech for recognition (315) is buffered in a manner similar to the buffering of input audio. Because the speech for recognition is so recorded, the send thread (220) can begin sending the speech for recognition as soon as voice activity begins, asynchronously with respect to the recording process, with no need to wait until all the speech for recognition has been recorded. The media thread (208), upon cessation of voice activity, blocks or waits until receipt of a voice recognition notification. Send thread (220) sends the speech for recognition (315) to the full-duplex network, asynchronously with respect to the recording process, in accordance with a VOIP protocol.

VOIP, standing for 'Voice Over Internet Protocol,' is a generic term for routing speech over an IP-based full-duplex network. The speech data flows over a general-purpose packet-switched full-duplex network, instead of traditional dedicated, circuit-switched voice transmission lines. Protocols used to carry voice signals over the IP full-duplex network are commonly referred to as 'Voice over IP' or 'VOIP' protocols. VOIP traffic may be deployed on any IP full-duplex network, including full-duplex networks lacking a connection to the rest of the Internet, for instance on a private building-wide local area full-duplex network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet full-duplex network.

Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled > RTP Payload Format for European Telecommunications Standards Institute (ETSI) European Standard ES 201 108 Distributed Speech Recognition Encoding and the Internet Draft entitled > RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for providing VOIP barge-in support for a half-duplex DSR client on a full-duplex network according to embodiments of the present invention may be encoded with any codec, including, for example:

AMR Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

In the example of FIG. 4, therefore, the VOIP connection (216) may implement a full-duplex network connection (222), through which audio may stream in both directions at the same time, as, for example, a Transmission Control Protocol ('TCP') connection using, for example, a socket implemented with a sockets application programming interface ('API') for TCP. The send thread (220) may attach an output audio stream to the socket, and the receive thread (212) may attach an input audio stream (214) to the socket. Then the send thread (220) may receive input audio from the full-duplex network through the input audio stream, and the receive thread (212) may send output audio to the full-duplex network through the output audio thread (218), both effectively at the same time.

Figure 5:
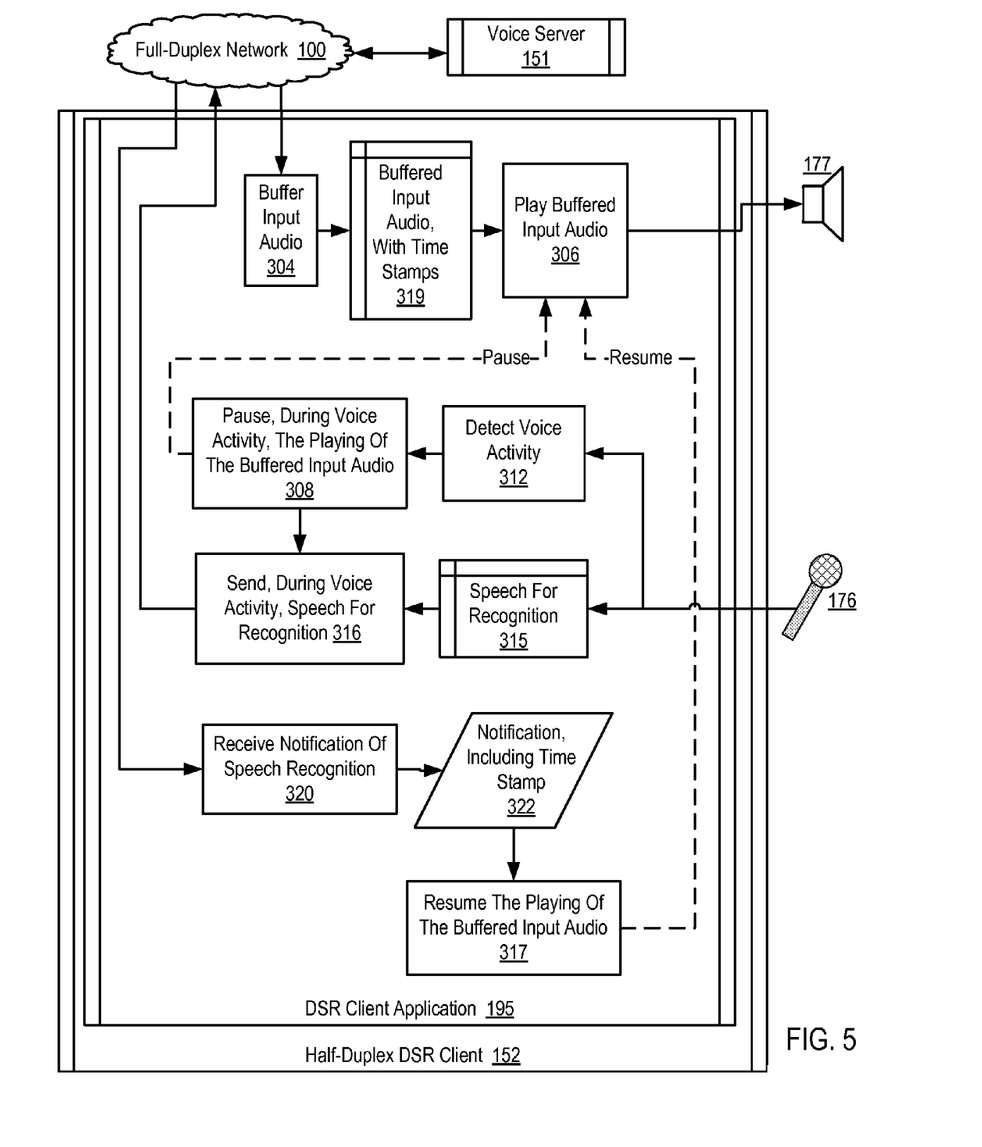
FIG. 5 sets forth a flow chart illustrating an exemplary method of providing VOIP barge-in support for a half-duplex DSR client on a full-duplex network according to embodiments of the present invention.

For further explanation, FIG. 5 sets forth a flow chart illustrating an exemplary method of providing VOIP barge-in support for a half-duplex DSR client (152) on a full-duplex network (100) according to embodiments of the present invention. In the following discussion, the method of FIG. 5 is described with reference to the method elements in the flow chart of FIG. 5 and also with reference to the system illustrated in FIG. 4.

The method of FIG. 5 includes buffering (304), in the half-duplex DSR client, input audio (318) from the full-duplex network, the input audio comprising VOIP audio data for output through the half-duplex DSR client. In the method of FIG. 5, the input audio from the full-duplex network (100) may be implemented as VOIP, and the half-duplex DSR client (152) may include a DSR client application (195). In the method of FIG. 5, buffering input audio may be carried out by receiving, by a receive thread (reference 212 on FIG. 4) that is a component of the DSR client application (195) VOIP audio data as VOIP from the full-duplex network (100) through an input audio stream (214 on FIG. 4) and storing the VOIP audio data in an input memory buffer (206 on FIG. 4).

In this example, the buffered input audio (318) bears time stamps. The time stamps are data values in the structure of the buffered input audio representing either the time when a packet of input audio data was transmitted from the voice server or when the packet was received in the half-duplex DSR client. A receive thread (212 on FIG. 4) of a half-duplex DSR client, for example, may insert time stamps in the buffered input audio, the time stamps indicating when the input audio was received by the half-duplex DSR client. Alternatively, the voice server may insert time stamps in the VOIP audio data, the time stamps indicating when the audio was transmitted from the voice serve to the half duplex DSR client. Inserting the time stamps by the server reduces the complexity of the half-duplex DSR client, and it is anticipated that there will be many more half-duplex DSR clients than voice servers. Moreover, many half-duplex DSR clients will be small devices, cell phones, PDAs, and the like. On the other hand, inserting the time stamps by the half-duplex DSR client saves network bandwidth. Which is preferred depends on the particular DSR implementation.

The method of FIG. 5 also includes playing (306), through the half-duplex DSR client (152), the buffered input audio (318). In the method of FIG. 5, playing (306) the buffered input audio (318) may be implemented by playing the buffered input audio by a media thread (208 on FIG. 4). Such a media thread may be implemented as a component of DSR client application (195).

The method of FIG. 5 also includes detecting (312) voice activity on the half-duplex DSR client. In the method of FIG. 5, detecting (312) voice activity on the half-duplex DSR client may be carried out by detecting voice activity by a VAD engine (184 on FIG. 4) and advising, by the VAD engine, a media thread (208 on FIG. 4) of the voice activity. As described in more detail above, the VAD engine may advise the media thread of voice activity by use of a VAD interrupt.

The method of FIG. 5 also includes pausing (308), during voice activity on the half-duplex DSR client, the playing (306) of the buffered input audio (318). In the method of FIG. 5, pausing (308) the playing of the buffered input audio may be implemented by pausing the playing of the buffered input audio by a media thread (208 on FIG. 4).

The method of FIG. 5 also includes sending (316), during voice activity on the half-duplex DSR client (152), speech for recognition (315) to be sent to the full-duplex network (100) and through the network to the voice server (151). In the method of FIG. 5, sending (316) speech for recognition (315) to the full-duplex network may be carried out by sending by a send thread (220 on FIG. 4) speech for recognition (315) as recorded by a media thread (208 on FIG. 4) in an output memory buffer (210 on FIG. 4).

The method of FIG. 5 also includes receiving (320) in the half-duplex DSR client (152) through the full-duplex network (100) from the voice server (151) notification (322) of speech recognition, where the notification bears a time stamp. The time stamp is a value in a data field of the notification data structure representing the time when the notification was transmitted from the voice server or the time when the notification was received in the half-duplex DSR client. The time stamp borne by the notification may be affixed by the voice server to the notification of speech recognition, so that the time stamp represents the time when the notification is sent from the voice server to the half-duplex DSR client. Alternatively, the time stamp may be affixed to the notification by a receive thread or a media thread when the notification is received in the half-duplex DSR client. If the time stamp is affixed to the notification in the half-duplex DSR client, the time stamp represents the time when the notification was received in the half-duplex DSR client.

Receiving (320) in the half-duplex DSR client (152) through the full-duplex network (100) from the voice server (151) notification (322) of speech recognition may carried out 'in-band,' where buffering (304) input audio is carried out receiving, by a receive thread (212 on FIG. 4), VOIP audio data from an input audio stream in accordance with a VOIP data communications protocol, and receiving (320) notification of speech recognition is effected the same VOIP data communications protocol, RTP or H.323, for example. Receiving (320) in the half-duplex DSR client (152) through the full-duplex network (100) from the voice server (151) notification (322) of speech recognition may carried out 'out-of-band,' where buffering (304) input audio is carried out receiving, by a receive thread (212 on FIG. 4), VOIP audio data from an input audio stream in accordance with one VOIP data communications protocol, RTP or H.323, for example, and receiving (320) notification of speech recognition is effected with another VOIP data communications protocol, DMSP or SIP, for example.

The method of FIG. 5 also includes resuming (317) the playing (306) of the buffered input audio (318) in response to receiving the notification of speech recognition, playing only buffered input audio (306) bearing time stamps later than the time stamp of the recognition notification. That is, a media thread (208 on FIG. 4), for example, discards buffered input audio rendered irrelevant by a barge-in.

In view of the explanations set forth above in this paper, readers will recognize that the benefits of providing VOIP barge-in support for a half-duplex DSR client on a full-duplex network according to various embodiments of the present invention typically include an improved ability for a user to barge-in on a voice dialog with a DSR system while reducing the risk that the user will be required to listen to prompts and responses rendered irrelevant by the barge-in.

Exemplary embodiments of the present invention are described largely in the context of a fully functional computer system for providing VOIP barge-in support for a half-duplex DSR client on a full-duplex network. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone full-duplex networks for voice communications and digital data communications full-duplex networks such as, for example, Ethernets™ and full-duplex networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing voice over the Internet Protocol ('VOIP') barge-in support for a half-duplex distributed speech recognition ('DSR') client on a full-duplex network, the method comprising:
   buffering, in the half-duplex DSR client, input audio from the full-duplex network, the input audio comprising VOIP audio data for output through the half-duplex DSR client, the buffered input audio bearing time stamps;
   playing, through the half-duplex DSR client, the buffered input audio;
   pausing, during voice activity on the half-duplex DSR client, the playing of the buffered input audio;
   sending, during voice activity on the half-duplex DSR client, speech for recognition through the full-duplex network to a voice server;
   receiving in the half-duplex DSR client through the full-duplex network from the voice server notification of speech recognition, the notification bearing a time stamp; and
   responsive to receiving the notification, resuming the playing of the buffered input audio, including playing only buffered input audio bearing time stamps later than the time stamp of the recognition notification.

2. The method of claim 1 wherein buffering input audio further comprises:
   receiving by the half-duplex DSR client audio data from an input audio stream;
   storing the audio data in an input memory buffer; and
   inserting time stamps in the buffered input audio, the time stamps indicating when the input audio was received by the half-duplex DSR client.

3. The method of claim 1 further comprising inserting by the voice server time stamps in the VOIP audio data, the time stamps indicating when the audio was transmitted from the voice serve to the half duplex DSR client.

4. The method of claim 1 wherein:
   buffering input audio further comprises receiving, by a receive thread, VOIP audio data from an input audio stream in accordance with a first VOIP data communications protocol; and
   receiving notification of speech recognition further comprises receiving the notification through the first VOIP data communications protocol.

5. The method of claim 1 wherein:
   buffering input audio further comprises receiving, by a receive thread, VOIP audio data from an input audio stream in accordance with a first VOIP data communications protocol; and
   receiving notification of speech recognition further comprises receiving the notification through a second VOIP data communications protocol.

6. The method of claim 1 further comprising affixing, by the voice server to the notification of speech recognition, the time stamp borne by the notification, the time stamp representing the time when the notification is sent from the voice server to the half-duplex DSR client.

7. Apparatus for providing voice over the Internet Protocol ('VOIP') barge-in support for a half-duplex distributed speech recognition ('DSR') client on a full-duplex network, the apparatus comprising:
   a computer processor; and
   a computer memory operatively coupled to the computer processor, the computer memory having disposed within it computer program instructions that, when executed by the computer processor, perform:

buffering, in the half-duplex DSR client, input audio from the full-duplex network, the input audio comprising VOIP audio data for output through the half-duplex DSR client, the buffered input audio bearing time stamps;

playing, through the half-duplex DSR client, the buffered input audio;

pausing, during voice activity on the half-duplex DSR client, the playing of the buffered input audio;

sending, during voice activity on the half-duplex DSR client, speech for recognition through the full-duplex network to a voice server;

receiving in the half-duplex DSR client through the full-duplex network from the voice server notification of speech recognition, the notification bearing a time stamp; and responsive to receiving the notification, resuming the playing of the buffered input audio, including playing only buffered input audio bearing time stamps later than the time stamp of the recognition notification.

8. The apparatus of claim 7 wherein buffering input audio further comprises:

receiving by the half-duplex DSR client audio data from an input audio stream;

storing the audio data in an input memory buffer; and inserting time stamps in the buffered input audio, the time stamps indicating when the input audio was received by the half-duplex DSR client.

9. The apparatus of claim 7 further comprising computer program instructions that, when executed, perform inserting, by the voice server time stamps in the VOIP audio data, the time stamps indicating when the audio was transmitted from the voice serve to the half duplex DSR client.

10. The apparatus of claim 7 wherein:

buffering input audio further comprises receiving, by a receive thread, VoIP audio data from an input audio stream in accordance with a first VOIP data communications protocol; and receiving notification of speech recognition further comprises receiving the notification through the first VOIP data communications protocol.

11. The apparatus of claim 7 wherein:

buffering input audio further comprises receiving, by a receive thread, VOIP audio data from an input audio stream in accordance with a first VOIP data communications protocol; and receiving notification of speech recognition further comprises receiving the notification through a second VOIP data communications protocol.

12. The apparatus of claim 7 further comprising computer program instructions that, when executed, perform affixing, by the voice server to the notification of speech recognition, the time stamp borne by the notification, the time stamp representing the time when the notification is sent from the voice server to the half-duplex DSR client.

13. A computer program product comprising at least one tangible computer-readable storage medium having instructions encoded thereon which, when executed, perform a method of providing voice over the Internet Protocol ('VOIP') barge-in support for a half-duplex distributed speech recognition ('DSR') client on a full-duplex network, the method comprising:

buffering, in the half-duplex DSR client, input audio from the full-duplex network, the input audio comprising VOIP audio data for output through the half-duplex DSR client, the buffered input audio bearing time stamps;

playing, through the half-duplex DSR client, the buffered input audio;

pausing, during voice activity on the half-duplex DSR client, the playing of the buffered input audio;

sending, during voice activity on the half-duplex DSR client, speech for recognition through the full-duplex network to a voice server;

receiving in the half-duplex DSR client through the full-duplex network from the voice server notification of speech recognition, the notification bearing a time stamp; and responsive to receiving the notification, resuming the playing of the buffered input audio, including playing only buffered input audio bearing time stamps later than the time stamp of the recognition notification.

14. The computer program product of claim 13 wherein buffering input audio further comprises:

receiving by the half-duplex DSR client audio data from an input audio stream;

storing the audio data in an input memory buffer; and inserting time stamps in the buffered input audio, the time stamps indicating when the input audio was received by the half-duplex DSR client.

15. The computer program product of claim 13, wherein the method further comprises inserting, by the voice server, time stamps in the VOIP audio data, the time stamps indicating when the audio was transmitted from the voice serve to the half duplex DSR client.

16. The computer program product of claim 13 wherein:

buffering input audio further comprises receiving, by a receive thread, VOIP audio data from an input audio stream in accordance with a first VOIP data communications protocol; and receiving notification of speech recognition further comprises receiving the notification through the first VOIP data communications protocol.

17. The computer program product of claim 13 wherein:

buffering input audio further comprises receiving, by a receive thread, VOIP audio data from an input audio stream in accordance with a first VOIP data communications protocol; and receiving notification of speech recognition further comprises receiving the notification through a second VOIP data communications protocol.

18. The computer program product of claim 13, wherein the method further comprises affixing, by the voice server to the notification of speech recognition, the time stamp borne by the notification, the time stamp representing the time when the notification is sent from the voice server to the half-duplex DSR client.

* * * * *